Sept. 29, 1931.        W. K. WILLIAMS        1,824,858
CONVEYER APPARATUS
Filed Jan. 9, 1931        2 Sheets-Sheet 1
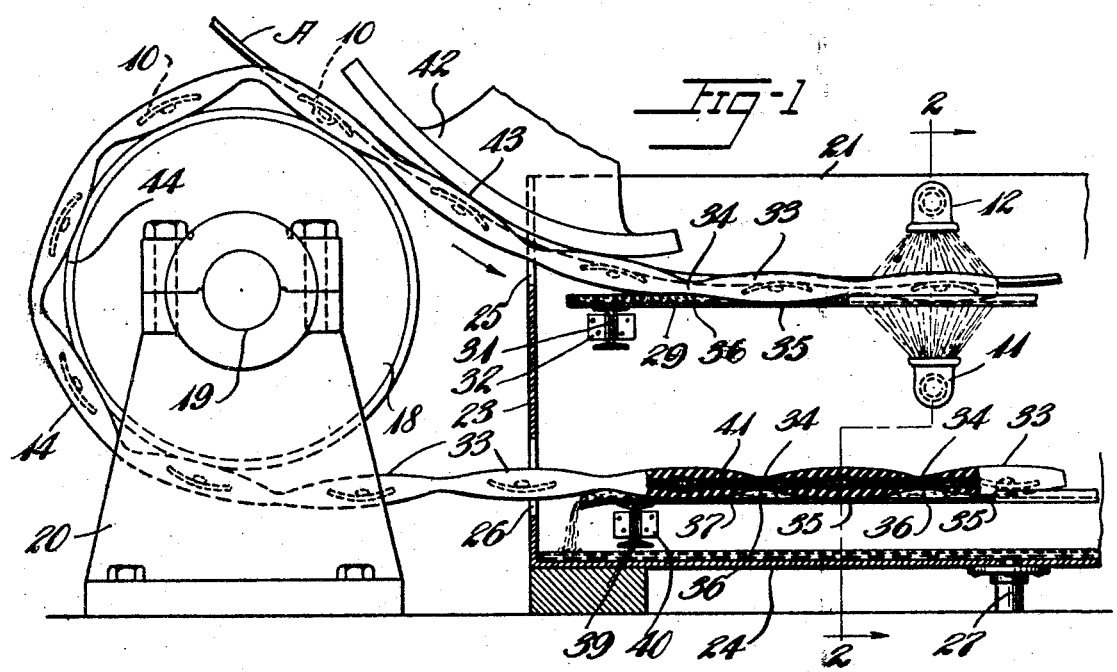
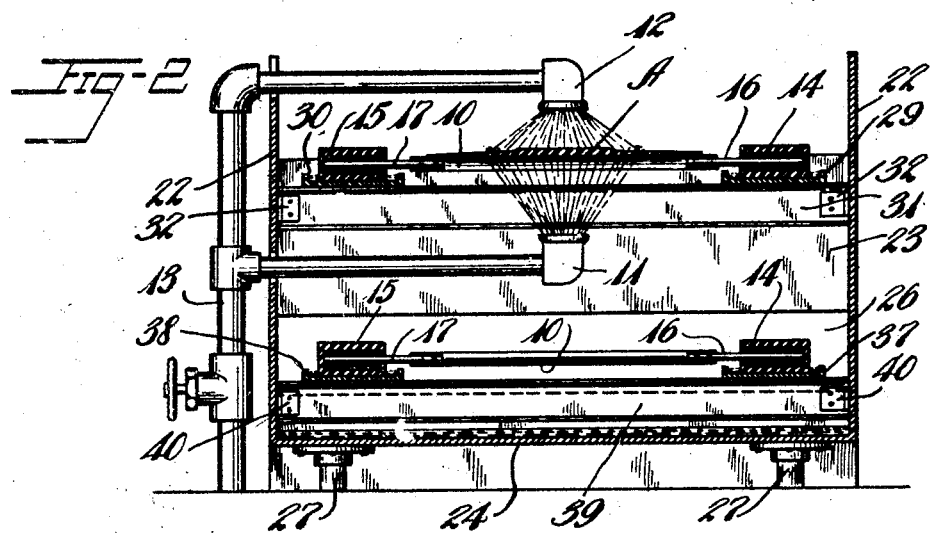
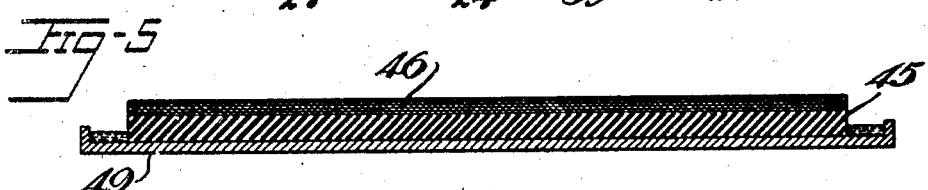
Inventor
Warren K. Williams
By Eakin & Avery
Attys.

Sept. 29, 1931.  W. K. WILLIAMS  1,824,858
CONVEYER APPARATUS
Filed Jan. 9, 1931  2 Sheets-Sheet 2
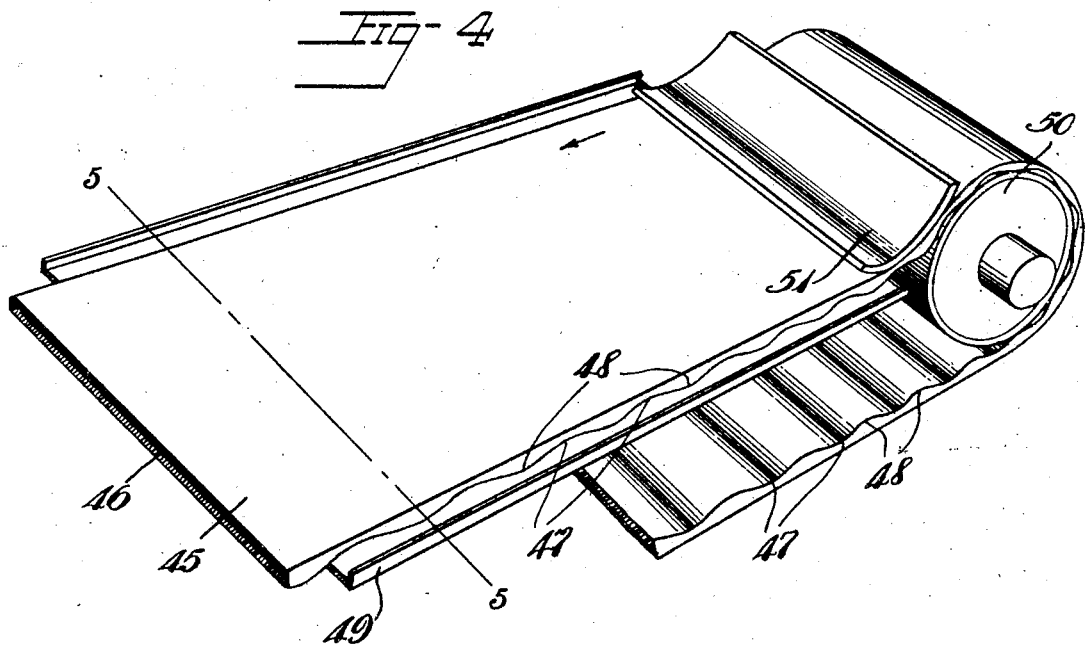
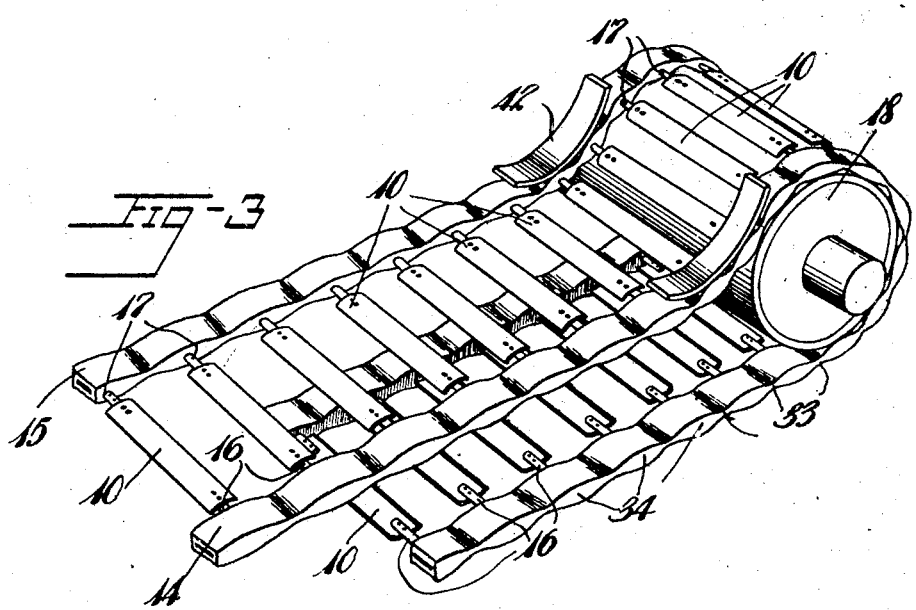
Inventor
Warren K. Williams
By Eakin & Avery
Attys.

Patented Sept. 29, 1931

1,824,858

UNITED STATES PATENT OFFICE

WARREN K. WILLIAMS, OF CUYAHOGA FALLS, OHIO, ASSIGNOR TO THE B. F. GOODRICH COMPANY, OF NEW YORK, N. Y., A CORPORATION OF NEW YORK

CONVEYER APPARATUS

Application filed January 9, 1931. Serial No. 507,585.

This invention relates to conveyer apparatus and more especially to apparatus which is particularly well suited to the conveying of material in the presence of water, as where the material is conveyed in an initially wet condition, or is wetted while being conveyed for cooling, washing or other treatment.

Conveyers of heretofore commonly existing types when used for conveying material in the pressure of water have presented difficulties in the way of properly lubricating sliding parts such as roller journals and bearings and pivots of chain links exposed to the water. Due to the presence of water at the sliding parts, it has been exceedingly difficult and in many cases virtually impossible to keep the parts adequately lubricated, the water acting to lessen the efficiency of such lubricants as oil and grease by mixing therewith and tending to wash such lubricants away from the rubbing surfaces. Where the parts are of metal, moreover, the water by its corrosive action promotes noisy operation, binding of parts and excessive wear which is sometimes augmented by gritty matter finding its way to the parts.

It is an object of the invention to provide conveyer apparatus having sliding parts adapted for efficient lubrication by water or like fluid, and wherein the necessity for using such a lubricant as oil or grease and the attendant difficulties above mentioned are obviated. It is a further object to provide a flexible carrier having surfaces adapted to slide against a support, the surfaces being adapted for efficient lubrication by water or like fluid.

In the drawings which form a part of the specification, and in which like numerals designate corresponding parts in different figures:

Fig. 1 is a fragmentary view in side elevation, partly in section, of a conveyer apparatus embodying the invention.

Fig. 2 is a sectional view taken along the line 2—2 of Fig. 1.

Fig. 3 is a fragmentary view in perspective of the carrier of the apparatus shown in Fig. 1.

Fig. 4 is a fragmentary view in perspective of a modified form of apparatus, showing a conveyer belt embodying my invention.

Fig. 5 is a sectional view taken along the line 5—5 of Fig. 4.

The apparatus chosen for illustration in Figs. 1, 2, and 3, is adapted to convey strip material, such as tread stock of rubber composition for automobile tires, and to permit the material while on the conveyer to be sprayed with water as for the purposes of cooling and shrinking the same so that it may be delivered from the conveyer in a desired condition for further operations.

A strip of tread material, designated A, coming from such source as a calender or an extruding machine, is received and supported for conveyance upon a moving carrier comprising a plurality of transverse slats 10 which are longitudinally spaced to permit water from a lower spraying device 11 to contact the lower surface of the moving tread strip while water from an upper spraying device 12 contacts the upper surface for cooling and shrinking the strip. Water is supplied to the spraying devices from a suitable source through a valved feeder pipe 13.

Each of the slats 10 of the carrier is supported by transversely spaced endless belts 14 and 15 by means of studs 16 and 17 which are rigid with the slat and have their outer ends embedded in the belts. The endless belts, which are of a construction to be explained more fully hereinafter, pass over end pulleys, one of which, a driving pulley, is shown at 18 in Fig. 1, journaled at 19 in a pedestal bearing 20. The upper and lower reaches of the endless carrier, between the end pulleys, pass through a housing 21 having side walls 22, end walls 23, and a water tight bottom 24, the end walls being apertured as at 25 and 26 for passage therethrough of the upper and lower reaches respectively, of the carrier. The housing 21 is arranged to serve as an enclosure to limit the splash and flow of water from the spraying devices and to direct the water to the bottom 24 where it may be removed through suitable drains 27.

The upper reach of the carrier is supported and guided by longitudinally disposed trays or channeled supports 29 and 30 in which the belt members 14 and 15, respectively, are adapted to slide. The trays 29 and 30 are supported by transverse beams, one of which is indicated at 31, which are attached to the side walls of the housing by brackets 32. Each of these trays is flanged to retain water and is so positioned as to catch at least a part of the splash and flow of water which is sprayed upon the strip material.

For supporting the lower return reach of the carrier flanged trays 37 and 38, similar to the upper trays 29 and 30, are provided, the lower trays being supported by transverse beams one of which is indicated at 39 which are secured to the side walls of the housing by brackets 40. The lower trays are arranged to catch a portion of the water which overflows from the upper trays or splashes from the carrier or the spraying devices.

Each of the belts 14 and 15 comprises a body of flexible material, such as soft rubber composition, strengthened by flexible stretch-resisting elements 41, which may be cords, fabric, chain links, or the like. The belt comprises a plurality of alternating thick portions 33 and thinner portions 34, the thick portions forming on each face of the belt a plurality of raised portions in the form of transverse ridges having bearing surfaces of rubber at 35 adapted to slide over the bottom of the supporting tray, and the thinner portions defining a plurality of transverse grooves 36 separating the bearing surfaces. The rubber bearing surfaces on being wetted with water contained in the tray and supplied to these surfaces by means of the belt grooves 36, are adapted to slide over the surface of the tray, which is preferably of metal, with but little frictional resistance.

The thickness of the belt between the portion at each bearing surface 35 and thin portion 34 in advance thereof is preferably of gradual reduction, causing the belt surface immediately in advance of each bearing surface to make an acute angle with the surface of the tray, by which construction water is caused to be wiped between the surfaces of the tray and moving belt. The surface of the belt in the region of each bearing portion is preferably slightly convex under zero pressure and the material of the belt in this region is preferably of soft, resilient rubber composition, whereby a load on the carrier will cause the resilient portion of the belt at and inward of the surface to yield somewhat and cause a bearing surface to be presented of sufficient area to give a low unit area pressure. Under increased loads, the area of each bearing surface automatically increases as the belt bears against the surface of the tray, tending to keep the unit area pressures sufficiently low to avoid squeezing the film of water out from between these surfaces. At the same time, the surface of the belt immediately in advance of the bearing surface maintains the sloping relation at an acute angle with the surface of the tray, thereby permitting water to be wiped into the bight between the surfaces, rather than to be squeegeed away from these surfaces as might occur if the belt surface were such that a sharp corner were formed at the leading margin of its bearing surface.

As long as the rubber surface of the belt which contacts the tray surface is kept wet, but little abrasive wear of these surfaces due to sliding friction will take place, and the presence of gritty matter, such as abrasive particles which might come from material conveyed, has but little detrimental effect on the bearing surfaces, the soft, resilient rubber surface of the belt tending to yield resiliently under the pressure of such particles and then to expel them, rather than to permit these particles to become permanently embedded in the surface of the belt and cause excessive wear.

The slats 10 of the carrier are connected by means of their attaching studs 16 and 17 to the belts 14 and 15 preferably at the thicker portions 33 which afford strong attachment at the zone of the reinforcement 41 without appreciably affecting the flexibility of the belt. Flexibility is imparted to the belt principally at the thinner portions 34 where the flexibility of the reinforcement 41 and the resilience of the rubber permit efficient flexing of the endless belt. The undulate form of the belt surface, whereby the belt is of progressively increasing thickness between each groove and adjacent ridges, with a consequent progressive decrease in flexibility over these zones, causes the stresses in the belt incident to flexing to be distributed rather than to be undesirably localized.

As shown in Figs. 1, 2, and 3, each of the belts 14 and 15 is fluted on both its upper and lower faces, presenting similar grooves and bearing surfaces on the opposite faces, whereby one face may act in cooperation with the upper tray and the opposite face with the lower tray in the respective reaches of the belt.

In order to assure smooth running of the belt, means may be provided for guiding the belt into its supporting tray. As illustrated in Fig. 1, the upper reach of the belt, which comes relatively slack from the driving pulley 18, is caused to dip into the tray 29. In this downward movement it is guided and depressed by a member 42 which may be a revolvable drum or may be a fixed member arranged to present a smooth belt contacting surface 42, preferably of metal, which will offer but little frictional resistance to the wet rubber surface of the moving belt. The belt being thus guided, undesirable slapping thereof as it passes between pulleys or other irregular movement which might disturb material on the carrier or unduly splash water from the tray, is prevented.

The lower return reach of the belt, being under tension from the driving pulley 18, is preferably permitted to pass in a straight line from the tray 37 to the pulley. It is feasible here to eliminate the end flange of the tray, for unhampered movement of the belt, as shown, inasmuch as the lower reach of the belt is without load and is under longitudinal tension, which causes bearing pressures to be comparatively light and makes adequate lubrication possible without retaining a large amount of water in the tray.

In order that undesirable slippage between the surface of the end pulley and the contacting wet, rubber surfaces of the belt will not occur, it may be desirable in some instances to provide means for increasing the grip of the belt on the pulley. As indicated in Fig. 1 this may be accomplished by the provision, on the surface of the pulley, of a layer 44 of soft yielding material, such as soft rubber, into which the thicker portions of the belt are adapted to be depressed by the pull of the belt to increase the slip-resisting grip of the belt on the pulley.

As will be understood, the invention has application to conveyer apparatus of forms other than shown in Figs. 1 to 3. In Figs. 4 and 5 there is illustrated an apparatus comprising an endless conveyer belt 45 having a plain outer face adapted to support and convey a load at the upper reach thereof. The belt is preferably of soft, resilient rubber composition strengthened by a flexible, stretch-resisting reinforcement 46 which may be in the form of several plies of woven fabric or cords. At its inner face, the belt is fluted to provide alternate grooves 47 and ridges 48 extending transversely of the belt, the ridges presenting convex bearing surfaces of rubber adapted to bear against the inner bottom surface of a flanged supporting tray or tank 49 in sliding relation therewith, and the grooves serving to conduct water contained in the tray to the bearing surfaces, all in a manner similar to that previously described for the belt of Fig. 1. The belt passes over end pulleys, one of which is shown at 50, and if desired a guiding means 51 may be provided for depressing the belt into the tray. The guiding means may be in the form either of a rotatable pulley or drum or of a fixed member having a smooth, convexly curved bearing surface. Water may be supplied to the tray by any suitable means, either for the sole purpose of lubricating the bearing surface of the sliding belt or for the dual purpose of treating material on the conveyer and lubricating the belt. The lower return reach of the belt 45 may be supported by any suitable means, which may be in the form of one or more supports each presenting a smooth surface, preferably of metal, against which the outer rubber face of the belt is adapted to slide. Such supports may be few in number and widely spaced, their sole function being to support a portion only of the weight of the belt with no additional load, and as the pressure of the belt on each support is comparatively light the water which is carried around with the belt by adhesion therewith is ordinarily sufficient for lubrication of the belt at these supporting surfaces.

Instead of providing the bearing surfaces of the belt at ridges which extend entirely across the belt, the bearing surfaces may be provided on ridges, protuberances or other raised portions which are spaced transversely of the belt as well as longitudinally thereof to afford greater accessibility of the water to the bearing surfaces, which construction might be desirable in some cases, as where the belt is of exceptionally great width.

These and other variations may be made without departing from the scope of the invention as it is defined in the following claims.

What is claimed is:

1. Conveyer apparatus comprising a support, a flexible carrier adapted to slide against said support, said support and carrier having cooperating bearing surfaces one of which is of resilient rubber composition and one of which is grooved for passage of a lubricant.

2. Conveyer apparatus comprising a support and a carrier adapted to slide against said support, said carrier comprising a plurality of flexibly joined elements defining space therebetween for passage of a lubricant, said support and each of said elements presenting cooperating bearing surfaces one of which is of resilient rubber composition.

3. Conveyer apparatus comprising a support, and a carrier comprising a plurality of flexibly joined elements presenting a plurality of bearing surfaces of rubber composition adapted to slide against a surface of said support, said elements defining space therebetween for conducting a lubricant to the bearing surfaces.

4. Conveyer apparatus comprising a receptacle for lubricant and a carrier having a bearing surface of resilient rubber composition adapted to slide against a lubricated surface of said receptacle.

5. Conveyer apparatus comprising a receptacle for lubricant and a carrier having a plurality of bearing surfaces of resilient rubber composition adapted to slide against a lubricated surface of said receptacle, and space between said bearing surfaces for passage of lubricant to said surfaces.

6. Conveyer apparatus comprising a receptacle for lubricant, and a flexible carrier having a plurality of spaced bearing surfaces of resilient rubber composition adapted to slide against a lubricated surface of said receptacle.

7. Apparatus as in claim 6 comprising means for guiding said carrier into contact with said lubricated surface.

8. Apparatus for conveying material in contact with a liquid, said apparatus comprising a support, a carrier adapted to slide against said support, said support and carrier having cooperating bearing surfaces one of which is of resilient rubber composition, and means for conducting liquid from the carrier to said surfaces for lubrication thereof.

9. A flexible carrier for conveyer apparatus, said carrier comprising a belt provided on a face thereof with spaced raised portions having bearing surfaces of resilient rubber composition adapted to slide against a wetted supporting surface, and a material carrying structure connected to the belt at a position adjacent a raised portion thereof.

10. A conveyer belt comprising on a face thereof a plurality of raised portions of resilient rubber composition having bearing surfaces adapted to slide against a wetted supporting surface, each of said raised portions being shaped to provide a surface contiguously in advance of the bearing surface at an acute angle with the supporting surface.

11. A conveyer belt provided on a face thereof with a plurality of raised portions of resilient rubber composition shaped to present convex bearing surfaces adapted to slide against a supporting surface, and space between said raised portions for passage of a lubricant.

12. A conveyer belt having a face thereof formed longitudinally undulate, presenting transversely extending ridges having bearing surfaces of resilient rubber composition adapted to slide against a supporting surface, alternate with transversely extending lubricant-conducting grooves, the flexibility of said belt being a maximum at each groove and being progressively less from the groove toward adjacent ridges.

It witness whereof I have hereunto set my hand this 3rd day of December, 1930.

WARREN K. WILLIAMS.